United States Patent
Lancioni et al.

(10) Patent No.: US 7,455,043 B2
(45) Date of Patent: Nov. 25, 2008

(54) VARIABLE-GEOMETRY INTAKE MANIFOLD FOR AN INTERNAL-COMBUSTION ENGINE

(75) Inventors: Federico Lancioni, Sangemini (IT); Michele Pecora, Potenza (IT)

(73) Assignee: Magneti Marelli Powertrain S.p.A., Corbetta (IT)

(*) Notice: Subject to any disclaimer, the term of this patent is extended or adjusted under 35 U.S.C. 154(b) by 0 days.

(21) Appl. No.: 11/831,596

(22) Filed: Jul. 31, 2007

(65) Prior Publication Data

US 2008/0029054 A1 Feb. 7, 2008

(30) Foreign Application Priority Data

Aug. 2, 2006 (EP) .................................. 06425556

(51) Int. Cl.
*F02B 31/00* (2006.01)
(52) U.S. Cl. .................................. 123/306; 123/184.53
(58) Field of Classification Search ............ 123/184.53, 123/184.56, 306
See application file for complete search history.

(56) References Cited

U.S. PATENT DOCUMENTS

2005/0028871 A1 2/2005 Kurita et al.

FOREIGN PATENT DOCUMENTS

| EP | 1398475 | 3/2004 |
| EP | 1568866 | 8/2005 |
| EP | 1632660 | 3/2006 |
| WO | 2006045027 | 4/2006 |

*Primary Examiner*—Noah Kamen
(74) *Attorney, Agent, or Firm*—Gottlieb, Rackman & Reisman

(57) ABSTRACT

Described herein is a variable-geometry intake manifold for an internal-combustion engine; the intake manifold is provided with: at least one intake pipe, which connects the intake manifold to at least one cylinder of the internal-combustion engine; a partialization device for varying the geometry of the intake manifold that has at least one partialization body, which is set inside the intake pipe and is provided with a shaft mounted so that it can rotate about an axis of rotation; and at least one angular-position sensor, which is designed to determine the angular position of the shaft about the axis of rotation and has a permanent magnet fixed on the shaft, and a reader, which is designed to read the orientation of the permanent magnet and is set on the outside of the intake pipe in the proximity of a wall of the intake pipe itself and in the proximity of the permanent magnet.

11 Claims, 5 Drawing Sheets

VARIABLE-GEOMETRY INTAKE MANIFOLD FOR AN INTERNAL-COMBUSTION ENGINE

TECHNICAL FIELD

The present invention relates to a variable-geometry intake manifold for an internal-combustion engine.

BACKGROUND ART

An internal-combustion engine is provided with a number of cylinders, each of which is connected to an intake manifold via at least one intake valve and to an exhaust manifold via at least one exhaust valve. The intake manifold receives fresh air (i.e., air coming form the outside environment) through a supply pipe provided with a throttle valve and is connected to the cylinders by means of respective intake pipes, each of which terminates in a position corresponding to at least one intake valve.

In a modern internal-combustion engine, the intake manifold can be of the variable-geometry type; i.e., it can be provided with a partialization device, which varies the cross section of the intake pipes as a function of the engine regime (i.e., the r.p.m. of the engine shaft). At low r.p.m. the section of passage of the air through the intake pipes is reduced so as to generate in the flow of intake air turbulences which improve mixing between air and fuel in the cylinders. Thanks to the presence of these turbulences which improve mixing, all the fuel injected is burnt and the pollutant emissions generated by combustion are thus reduced. At high r.p.m. the section of passage of the air through the intake pipes is maximized so as to enable a complete filling of the cylinders and hence generation of the maximum possible power.

For example, the partialization devices of the same type as the one described above may be either tumble devices or else swirl devices. A tumble device uses for each intake pipe a partialization body that is mobile away from and to an active position, in which the partialization body reduces the cross section of the intake pipe. A swirl system envisages that each intake pipe comprises two channels parallel to one another and set alongside one another and uses for each intake pipe a partialization body that is mobile away from and to an active position, in which the partialization body closes one of the two channels of the intake pipe completely.

In partialization devices present on the market, all the partialization bodies are fitted on a common shaft so as to rotate together away from and to the active position under the thrust of a common actuator device, which is designed to control in a simultaneous and synchronous way the position of all the partialization bodies themselves. In addition, in partialization devices present on the market, a position sensor is provided, which is generally coupled to the common actuator device or to the common shaft and determines the position of the partialization bodies, thus determining the angular position of the common shaft.

However, currently known position sensors used in partialization devices available on the market are costly and complex to install. In addition, since known position sensors detect the angular position of the common shaft, they do not detect directly the actual position of the partialization bodies and hence are not able to detect whether, on account of a mechanical problem, one of the partialization bodies no longer receives motion from the actuator device. Finally, on account of their dimensions, known position sensors are suitable for being coupled to the common shaft, but are not suitable for being coupled to a single partialization body to determine directly the actual position of the partialization body itself. In this connection, it should be noted that proper operation of a partialization device is necessary for reducing the pollutant emissions generated by combustion at low r.p.m. Consequently, an accurate control of proper operation of the partialization device is necessary to meet the requirements of the European-Community standard referred to as EURO-4.

WO2006045027A1 discloses a charge motion control valve actuator method and apparatus that utilizes a motor, an output shaft, a control circuit, and a sensor to provide closed loop control of the position of the output shaft via the motor; feedback from the sensor enables the control circuit to control the position of the output shaft, and the control circuit can also output data relating to the position of the output shaft.

DISCLOSURE OF INVENTION

The aim of the present invention is to provide a variable-geometry intake manifold for an internal-combustion engine that will be free from the drawbacks described above and, in particular, will be easy and economically advantageous to produce.

According to the present invention, a variable-geometry intake manifold for an internal-combustion engine is provided as claimed in the attached claims.

BRIEF DESCRIPTION OF THE DRAWINGS

The present invention will now be described with reference to the annexed plate of drawings, which illustrates some non-limiting examples of embodiment thereof and in which.

PREFERRED EMBODIMENTS OF THE INVENTION

Figure 1:
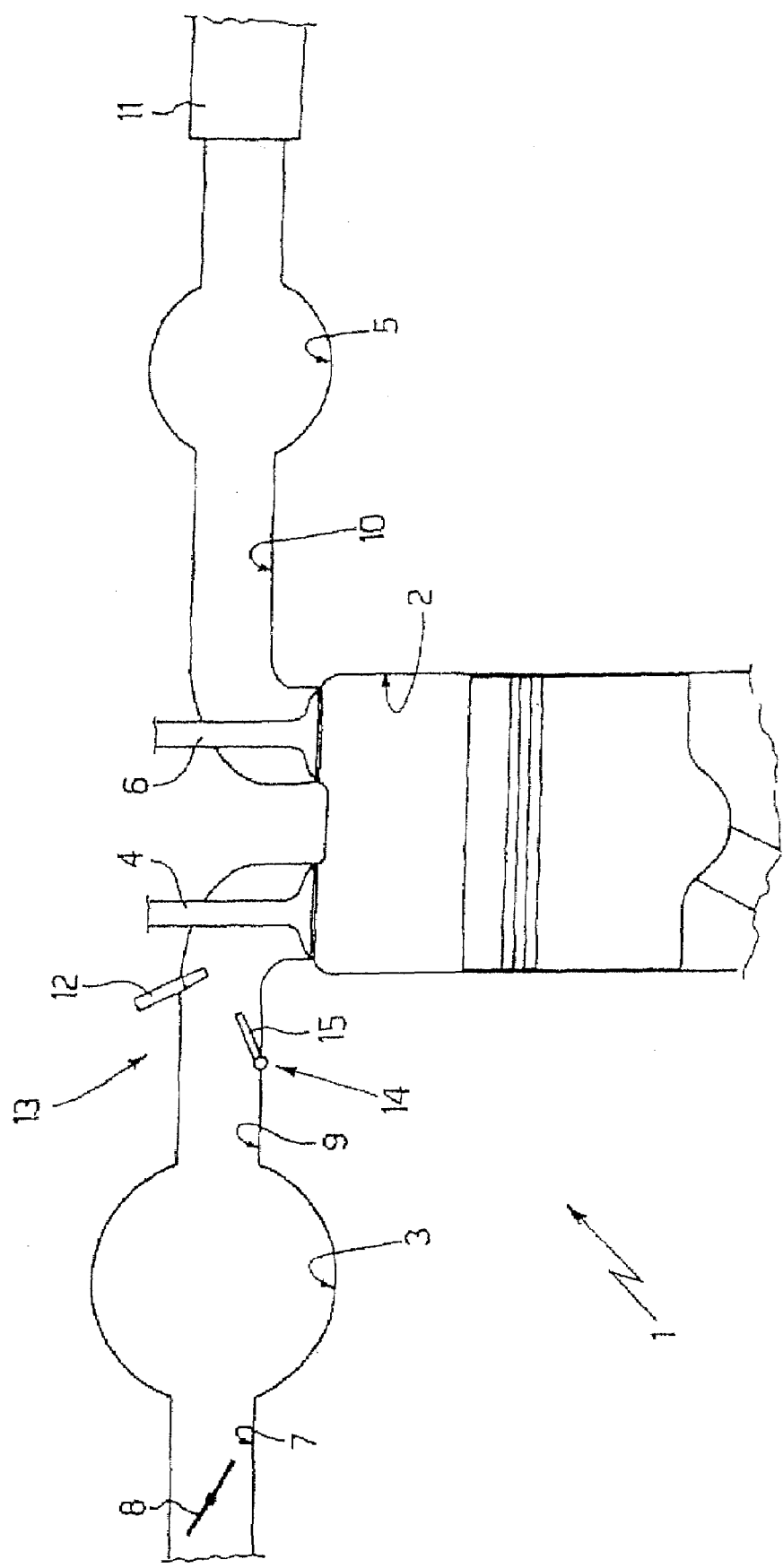
FIG. 1 is a schematic view of an internal-combustion engine provided with an intake manifold built according to the present invention.

In FIG. 1, the reference number 1 designates as a whole an internal-combustion engine provided with four cylinders 2 (only one of which is illustrated in FIG. 1), each of which is connected to an intake manifold 3 via at least one intake valve 4 and to an exhaust manifold 5 via at least one exhaust valve 6.

The intake manifold 3 receives fresh air (i.e., air coming from the outside environment) through a supply pipe 7 regulated by a throttle valve 8 and is connected to the cylinders 2 by means of respective intake pipes 9 (only one of which is illustrated in FIG. 1), each of which is regulated by the corresponding intake valve 4. Likewise, the exhaust manifold 5 is connected to the cylinders 2 by means of respective exhaust pipes 10 (only one of which is illustrated in FIG. 1), each of which is regulated by the corresponding exhaust valve 6. Stemming from the exhaust manifold 5 is an outlet pipe 11, which terminates with a muffler (known and not illustrated) for introducing into the atmosphere the gases produced by combustion.

According to the embodiment illustrated, the fuel (for example petrol, diesel, methane, LPG, etc.) is injected into each intake pipe 9 by means of an injector 12 set in the proximity of the intake valve 4. According to a different embodiment (not illustrated), the injectors 12 are arranged so as to inject the fuel directly into the cylinders 2.

Figure 2:
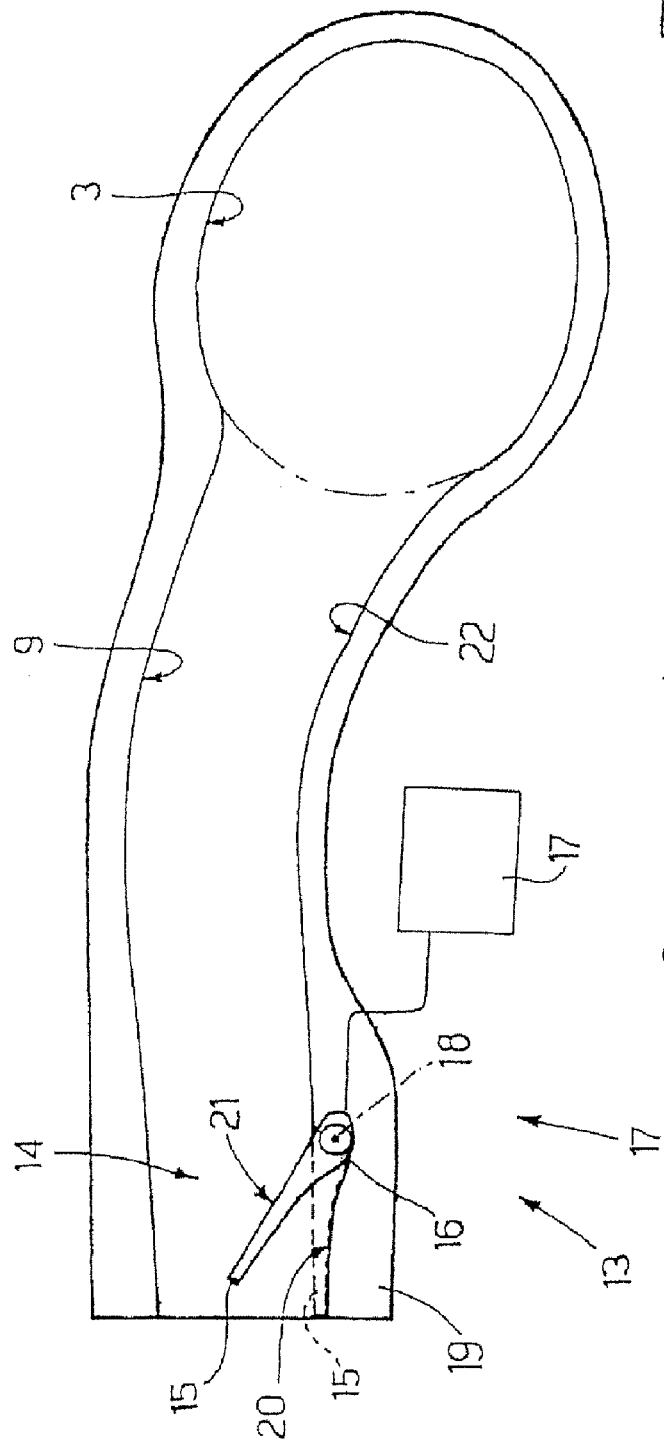
FIG. 2 is a view at an enlarged scale and with parts removed for reasons of clarity of the intake manifold of FIG. 1.

The intake manifold 3 comprises a partialization device 13 of a tumble type, which varies the cross section of the intake pipes 9 as a function of the r.p.m. of the engine 1. According to what is illustrated in FIG. 2, the partialization device 13 comprises for each intake pipe 9 a partialization valve 14, which has a partialization body 15 fitted on a shaft 16 so as to rotate under the thrust of an actuator device 17 about an axis 18 of rotation set in a transverse direction and externally with respect to the corresponding intake pipe 9.

Preferably, a single common actuator device 17 is provided, which is mechanically connected to all the partialization bodies 15 of the four partialization valves 14. Alternatively, each partialization valve 14 could comprise an actuator device 17 of its own and be thus mechanically independent of the other partialization valves 14. In other words, the partialization bodies 15 of the four partialization valves 14 might not be mechanically connected to one another and could hence be free to rotate with respect to one another.

In use, each partialization body 15 rotates under the thrust of the actuator device 17 between an active position (illustrated with a solid line in FIG. 2), in which the partialization body 15 reduces the section of passage of the air of the intake pipe 9, and a resting position (illustrated with a dashed line in FIG. 2), in which the partialization body 15 does not bring about any reduction in the section of passage of the air of the intake pipe 9.

For each partialization body 15, the shaft 16 is embedded in a wall 19 of the intake pipe 9 and rotates about the axis 18 of rotation. In addition, the wall 19 of each intake pipe 9 has an internal seat 20, which is designed to house the partialization body 15 when the partialization body 15 itself is set in the resting position. When a partialization body 15 is set in the resting position, a top surface 21 of the partialization body 15 constitutes a prosecution of an internal surface 22 of the intake pipe 9 and is radiused substantially without solution of continuity with the internal surface 22 itself. In particular, in the resting position, the top surface 21 of each partialization body 15 is substantially parallel to the central axis of the intake pipe 9, whilst, in the position where it comes out most, the top surface 21 of each partialization body 15 forms an angle of approximately 30-45° with the central axis of the intake pipe 9.

Figure 4:
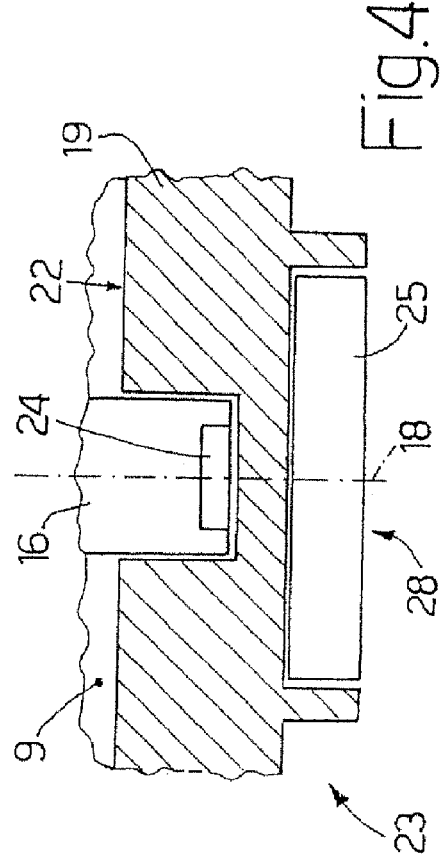
FIG. 4 is a schematic cross-sectional view with parts removed for reasons of clarity of an angular-position sensor of the intake manifold of FIG. 1.
Figure 3:
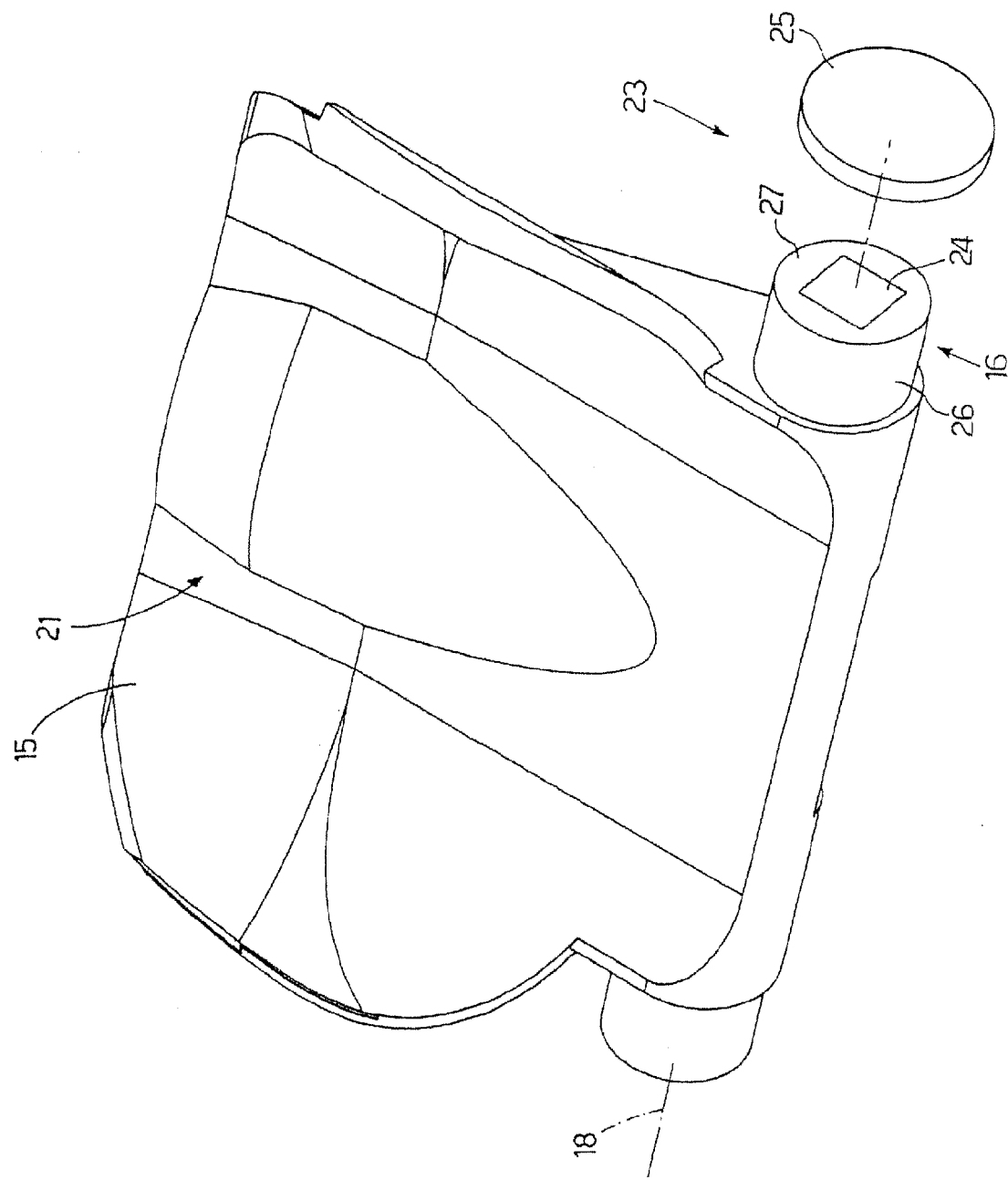
FIG. 3 is a schematic perspective view of a partialization body of the intake manifold of FIG. 1.

According to what is illustrated in FIGS. 3 and 4, the partialization device 13 comprises a position sensor 23 coupled to one of the partialization bodies 15 for determining the angular position of the corresponding shaft 16 about the axis 18 of rotation. Normally, the position sensor 23 is coupled to the partialization body 15 furthest away from the actuator device 17, in so far as said partialization body 15 is set in the last position in the mechanical transmission that transmits motion from the actuator device 17 and hence is the most subject to any possible mechanical problems.

According to a different embodiment (not illustrated), the partialization device 13 comprises, for each partialization body 15, a corresponding position sensor 23. Obviously, said choice is imperative when each partialization valve 14 comprises an actuator device 17 of its own and is consequently mechanically independent of the other partialization valves 14.

The angular-position sensor 23 comprises a permanent magnet 24 fixed on the shaft 16, and a reader 25, which is of a magneto-resistive type, is designed to read the orientation of the permanent magnet 24 and is set on the outside of the intake pipe 9 in the proximity of the wall 19 of the intake pipe 9 itself and in the proximity of the permanent magnet 24.

According to what is illustrated in FIG. 3, the shaft 16 has a cylindrical shape and has a cylindrical side wall 26 and a pair of plane end walls 27 opposite to one another. The permanent magnet 24 of the angular-position sensor 23 is fixed to an end wall 27 of the shaft 16. Preferably, the permanent magnet 24 of the angular-position sensor 23 is embedded in the shaft 16 and is co-moulded together with the shaft 16 itself.

According to a preferred embodiment illustrated in FIG. 4, the wall 19 of the intake pipe 9 comprises a blind external seat 28, housed in which is the reader 25 of the angular-position sensor 23. Preferably, the reader 25 of the angular-position sensor 23 is screwed to the external seat 28. Alternatively, the reader 25 can rest on the wall 19 of the intake pipe 9 (i.e., in direct contact with the wall 19 of the intake pipe 9), or else can be slightly raised with respect to the wall 19 of the intake pipe 9.

Figure 5:
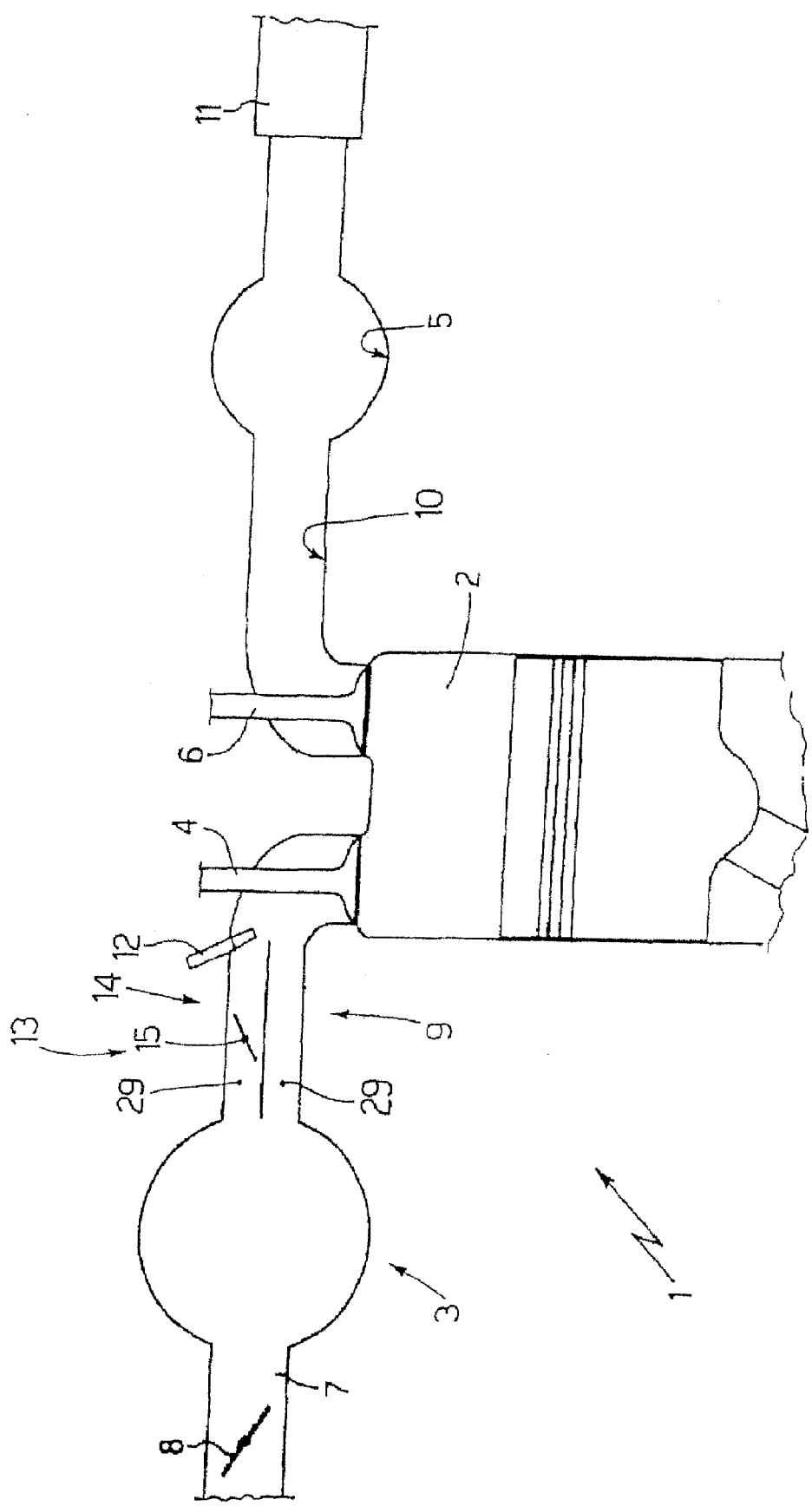
FIG. 5 is a schematic view of an internal-combustion engine provided with a different embodiment of an intake manifold built according to the present invention.
Figure 6:
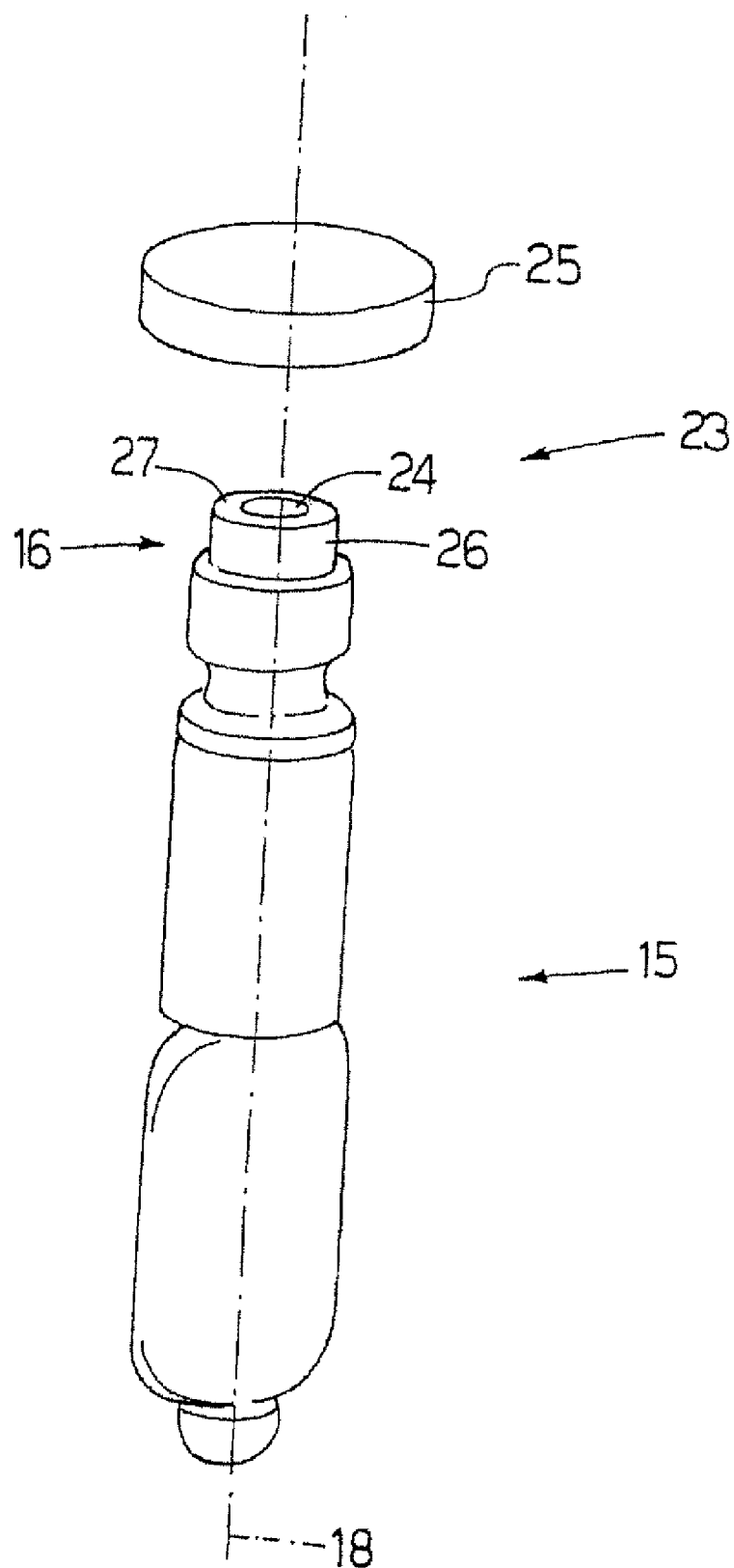
FIG. 6 is a schematic perspective view of a partialization body of the intake manifold of FIG. 5.

According to a different embodiment illustrated in FIGS. 5 and 6, each intake pipe 9 comprises, in an intermediate portion thereof, two channels 29 parallel to one another. The partialization device 13 is of a swirl type and comprises, for each intake pipe 9, a partialization valve 14, which is mounted along one of the two channels 29 of the intake pipe 9 and is designed to vary the section of passage of the air through the channel 29 itself. In particular, the partialization body 15 of each partialization valve 14 is mobile between a closing position, in which it closes the channel 29 completely, and a position of maximum opening.

The use of the angular-position sensor 23 described above presents numerous advantages in so far as said angular-position sensor 23 is inexpensive, is convenient and fast to install and presents a high precision of measurement. In particular, the installation of the angular-position sensor 23 is convenient and fast in so far as the reader 25 of the angular-position sensor 23 is set on the outside of the intake pipe 9, and hence it is not necessary to make any type of perforation of the intake pipe 9. In addition, it is simple and straightforward to carry out checks, maintenance operations or replacements of the reader 25 of the angular-position sensor 23 even when the intake manifold 3 is installed in the engine 1.

The angular-position sensor 23 described above does not introduce any type of friction on the rotation of the shaft 16 in so far as the reader 25 of the angular-position sensor 23 is of the contactless type and is consequently mechanically independent of the permanent magnet 24 and in so far as it does not require the presence of any dynamic or static seal ring coupled to the shaft 16.

Finally, the angular-position sensor 23 described above detects directly the effective position of the partialization body 15 and is thus able to detect whether, on account of a mechanical problem, the partialization body 15 no longer receives motion from the actuator device 17.

The invention claimed is:

1. A variable-geometry intake manifold (3) for an internal-combustion engine (1); the intake manifold (3) comprising:
    at least one intake pipe (9), which connects the intake manifold (3) to at least one cylinder (2) of the internal-combustion engine (1);

a partialization device (13) for varying the geometry of the intake manifold (3) that comprises at least one partialization body (15), which is set inside the intake pipe (9) and is provided with a shaft (16) mounted so that it can rotate about an axis (18) of rotation; and at least one angular-position sensor (23) for determining the angular position of the shaft (16) about the axis (18) of rotation;

the intake manifold (3) being characterized in that the angular-position sensor (23) comprises:

a permanent magnet (24) fixed on the shaft (16) and set on the inside of the intake pipe (9); and a reader (25), which is designed to read the orientation of the permanent magnet (24) and is set on the outside of the intake pipe (9) in the proximity of a wall (19) of the intake pipe (9) itself and in the proximity of the permanent magnet (24).

2. The intake manifold (3) according to claim 1, wherein the shaft (16) has a cylindrical shape and has a cylindrical side wall (26) and a pair of plane end walls (27) opposite to one another; the permanent magnet (24) of the angular-position sensor (23) being fixed to an end wall (27) of the shaft (16).

3. The intake manifold (3) according to claim 1, wherein the wall (19) of the intake pipe (9) comprises a blind external seat (28), housed in which is the reader (25) of the angular-position sensor (23).

4. The intake manifold (3) according to claim 3, wherein the reader (25) of the angular-position sensor (23) is screwed to the wall (19) of the intake pipe (9).

5. The intake manifold (3) according to claim 1, wherein the reader (25) of the angular-position sensor (23) is of a magneto-resistive type.

6. The intake manifold (3) according to claim 1, wherein the permanent magnet (24) of the angular-position sensor (23) is embedded in the shaft (16) and is co-moulded together with the shaft (16) itself.

7. The intake manifold (3) according to claim 1, wherein the partialization device (13) is of a tumble type and the partialization body (15) is mobile towards an active position in which the partialization body (15) itself reduces the cross section of the intake pipe (9).

8. The intake manifold (3) according to claim 7, wherein the axis (18) of rotation of the partialization body (15) is set on the outside with respect to the intake pipe (9), in such a way that, in a resting position, the partialization body (15) does not bring about any reduction of the section of passage of the air of the intake pipe (9).

9. The intake manifold (3) according to claim 8, wherein the shaft (16) of the partialization body (15) is embedded in a wall (19) of the intake pipe (9).

10. The intake manifold (3) according to claim 9, wherein the wall (19) of the intake pipe (9) has an internal seat (20), which is designed to house the partialization body (15) when the partialization body (15) itself is set in a resting position.

11. The intake manifold (3) according to claim 1, wherein the intake pipe (9) comprises, in an intermediate portion thereof, two channels (29) parallel to one another, the partialization device (13) is of a swirl type, and the partialization body (15) is set inside a channel (29) of the intake pipe (9) so as to displace between a closing position in which it closes the channel (29) completely and a position of maximum opening.

* * * * *

UNITED STATES PATENT AND TRADEMARK OFFICE
Certificate

Patent No. 7,455,043 B2

Patented: November 25, 2008

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Federico Lancioni, Sangemini (IT); Michele Pecora, Potenza (IT); Roberto Piciotti, Bologna (IT); and Andrea Baldassari, Bologna (IT).

Signed and Sealed this Sixth Day of July 2010.

MICHAEL CUFF
*Supervisory Patent Examiner*
Art Unit 3741
Technology Center 3700